May 22, 1923.
J. HARRIS
INCUBATOR
Filed July 24, 1922        2 Sheets-Sheet 1
1,456,005
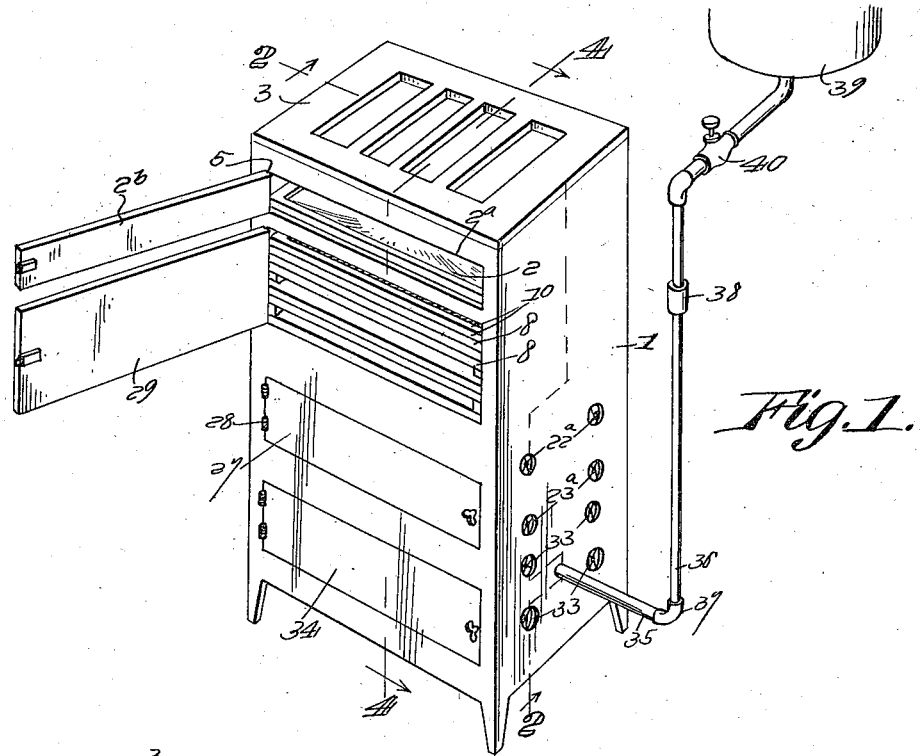
Fig. 1.
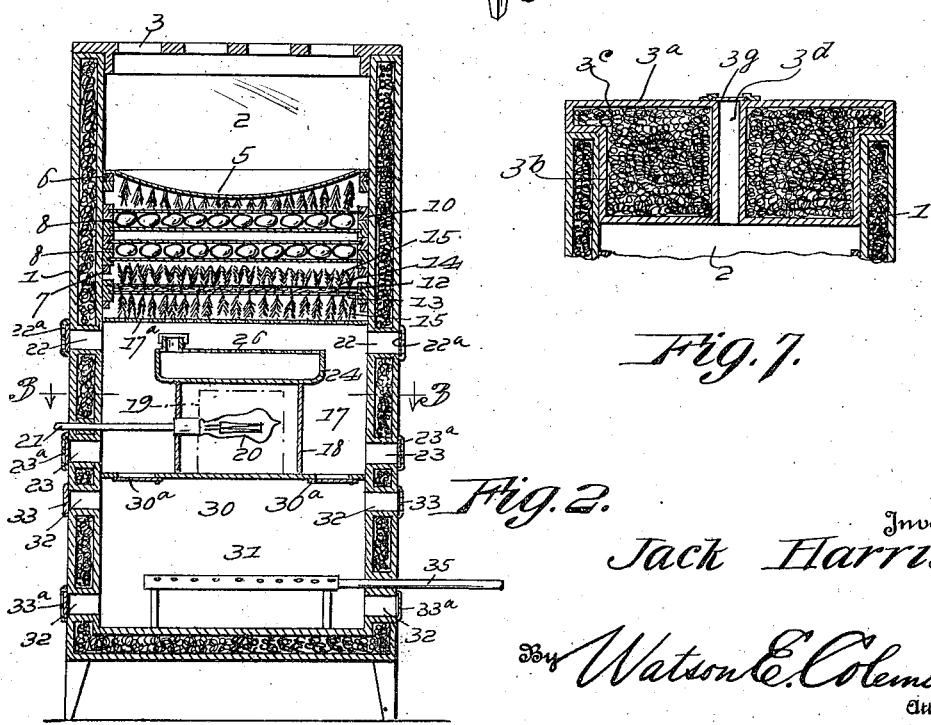
Fig. 2.
Fig. 7.
Inventor
Jack Harris,
By Watson E. Coleman
Attorney May 22, 1923.
J. HARRIS
INCUBATOR
Filed July 24, 1922
1,456,005
2 Sheets-Sheet 2
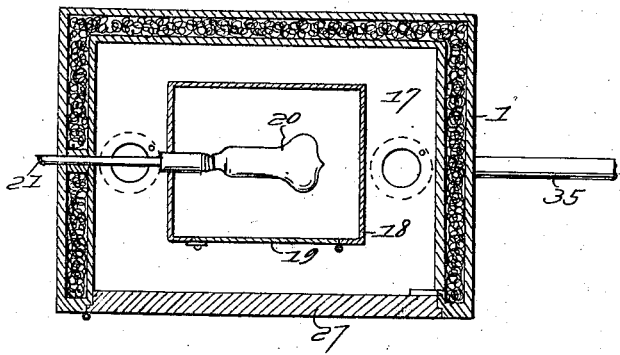
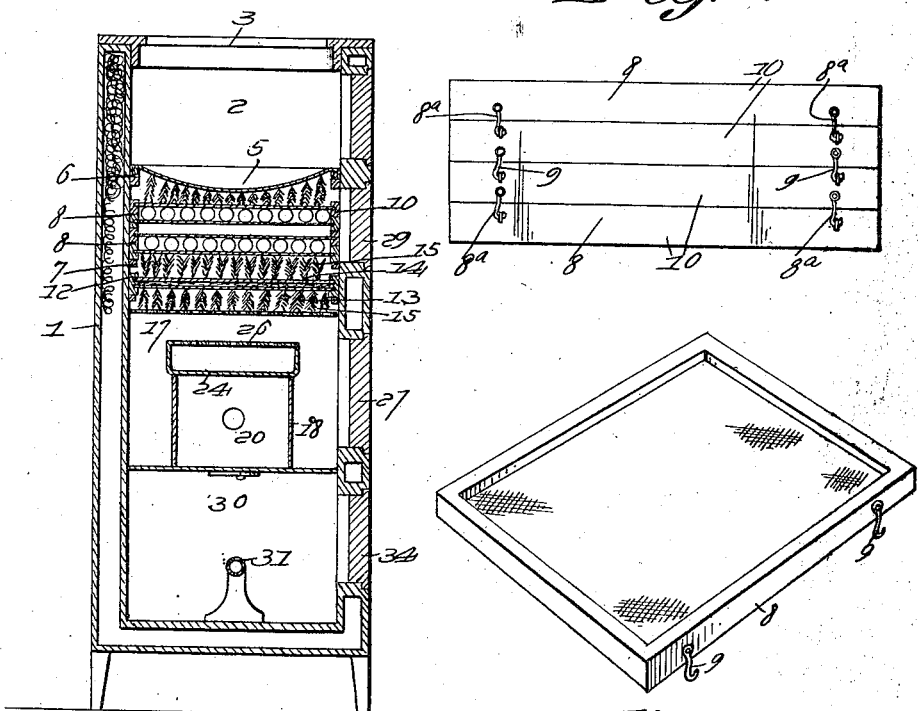
Inventor
Jack Harris,
By Watson E. Coleman
Attorney Patented May 22, 1923.

1,456,005

UNITED STATES PATENT OFFICE.

JACK HARRIS, OF OKLAHOMA, OKLAHOMA.

INCUBATOR.

Application filed July 24, 1922. Serial No. 577,139.

*To all whom it may concern:*

Be it known that I, JACK HARRIS, a citizen of the United States, residing at Oklahoma city, in the county of Oklahoma and State of Oklahoma, have invented certain new and useful Improvements in Incubators, of which the following is a specification, reference being had to the accompanying drawings.

The present invention has for its purpose the provision of an incubator including a nest for the hen, in order that the eggs may be kept warm or at the proper temperature from above, as well as from the heat generated below.

Another purpose is to provide an incubator including a compartment for the reception of an invertible egg tray, which is below the nest, and also the feather tray, which protects the eggs, and assists materially in retaining the warmth to the eggs, in a manner similar to the heat action from the hen.

Still another purpose is the provision of an incubator including a pair of heat chambers, one containing an oil burner, the other containing an electric heater, so that either heat apparatus may be employed for generating the heat in the chambers.

A further purpose is the provision of means for moistening the heat in the heat chamber.

It is to be understood that the particulars herein given are in no way limitative and that while still keeping within the scope of the invention, any desired modifications of detail and desired proportions may be made in the apparatus according to circumstances.

The invention comprises further features and combination of parts, as will be hereinafter set forth, shown in the drawings and claimed.

In the drawings:—

Figure 1 is a view in perspective of the improved incubator constructed in accordance with the invention;

Figure 2 is a vertical sectional view on line 2—2 of Figure 1;

Figure 3 is a sectional view on line 3—3 of Figure 2;

Figure 4 is a vertical sectional view on line 4—4 of Figure 1;

Figure 5 is an enlarged detail view in elevation of the egg trays, showing how they are hooked together and how the sections are hooked together;

Figure 6 is a detail perspective view of one of the sections of one of the trays;

Figure 7 is an enlarged detail view of a modified form of cover, which is used in connection with the incubator when the hen is not upon the nest 5;

Referring to the drawings, I designates the incubator casing, the upper portion of which is provided with a compartment 2, which is closed at three of its sides and provided with an opening $2^a$ on its fourth side, there being a closure or door $2^b$ for closing said opening. The top of the incubator is open, and has a cover 3 which is slatted, to permit the hen to receive fresh air while setting. Obviously when the hen is not on the nest, the top of the compartment 2 may be closed by an entirely different cover $3^a$, which is hollow, and is filled with feathers in order to retain the heat in the compartment 2, and also to keep out the cold. This cover $3^a$ has a contracted portion $3^b$ which fits within the compartment 2 a substantial distance. In fact the upper part of the cover $3^a$ is constructed of wood or the like, whereas the contracted portion $3^b$ is constructed from a heavily stiffened fabric, for the purpose of containing the feathers $3^c$. The cover $3^b$ has a central opening $3^d$, there being a slide damper $3^g$, for controlling the escape of heat from the compartment, thereby regulating the temperature on the interior thereof. The cover $3^b$ is designed primarily for retaining the heat in the compartment 2 and to keep the eggs in the egg trays at the proper temperature when the hen is off the nest.

The bottom of the compartment 2 contains a suitable canvas or duck nest 5 on which the hen sets. The canvas of the nest is secured to a rectangular frame 6, which is capable of being removed, if the occasion requires, through the opening $2^a$.

Arranged below the nest and mounted upon guides 7 is a pair of egg trays 8. Each egg tray comprises upper and lower sections, which are secured together by means of suitable hooks $8^a$; whereas the two trays are connected together by means of suitable hooks 9. The sections of each tray have upper and lower pieces of canvas, between which the eggs are arranged, and when the tray is in place, one canvas side or face is adjacent the bottom of the eggs, so as to receive the heat rising from below. It is possible to remove the egg trays and invert them, and reinsert them on their guides, without handling or touching the eggs.

Arranged below the egg trays is a suitable feather tray, which is disposed in close position to the lower egg tray, thereby acting to keep the eggs in the tray warm, in a manner similar to the heat rising from the body of a hen. This feather tray comprises a frame 12, which has a covering of fabric, such as duck or canvas 13, which holds the feathers in place. In fact feathers 14 are arranged between the canvas faces, and feathers 15 are attached to the upper and lower faces of the canvas pieces.

Suspended from the under surface of the canvas or duck nest adjacent the corners thereof are feathers 16, which also act to retain the heat, and prevent those eggs which are not covered by the hen from being chilled.

A heat compartment 17 is provided below the feather tray, and arranged therein is a heat casing 18 provided with a door 19. This heat casing 18 contains an electric bulb 20, which receives current from any suitable source (not shown) over the wires or leads 21. The wall of the compartment 17 at opposite sides adjacent the top is provided with suitable damper controlled openings 22, for the purpose of regulating the heat in the chamber or compartment. In other words if the heat becomes too intense in the chamber or compartment 17, the dampers 22$^a$ of the openings 22 may be opened, sufficiently to permit the escape of the heat, thereby reducing the temperature therein. The opposite sides of the compartment 17, particularly at their lower portions are provided with damper controlled openings 23, the dampers 23$^a$ of which may be opened and regulated according to the temperature desired in the compartment, and according to the adjustment of the dampers of the openings 22, to insure regulation of the heat in the chamber.

Also mounted in the compartment or chamber 17 above the heat casing 18 is a suitable moistening apparatus 24, which comprises a casing, for the reception of water. This casing of the moistening device may be any suitable shape, preferably elongated as shown, and the upper portion of the casing of the moistener is provided with a plurality of openings or apertures 26, from which the moisture from the water in the casing is allowed to escape into the compartment or chamber 17, and thereby moistening the heat. This arrangement prevents the eggs from becoming too dry, during the incubation of the eggs.

The compartment or chamber 17 is provided with a suitable door or closure 27 which is hingedly mounted as at 28, for the purpose of retaining the heat in the compartment. The compartment which contains the egg trays and the feather tray is also provided with a door or closure 29, to permit access to the trays. It is obvious that the eggs may be readily turned, when such action is desired, without touching or handling the eggs.

The incubator casing is provided with a compartment or chamber 30 below the heat chamber 17, and mounted in the heat chamber 30 is a suitable oil burner 31. The wall of the compartment 30 is provided with openings or apertures 32 having dampers 33, and are adapted for permitting the escape of the smoke, and the intense heat. In fact by opening these dampers, the heat may be regulated. A suitable door or closure 34 is hingedly mounted to the lower portion of the incubator casing, for the purpose of closing the compartment 30.

The oil burner has an extension pipe 35 extending through the wall of the incubator casing, and which in turn is connected to a pipe section 36 by means of an elbow 37$^a$. The pipe section 36 is in turn connected to a pipe section 37 by means of a sleeve, nipple or fitting 38. The pipe section 37 connects to a suitable fuel tank 39, and is provided with a suitable valve 40, for controlling the flow of oil or other fuel to the burner.

It is obvious that it is unnecessary to keep the incubator continually heated at all times, for the reason that after heat has been supplied for a substantial period, the incubator will retain its heat for seven, eight or nine hours, especially in warm weather. Of course, in extreme cold weather the incubator will only retain the heat, after once being heated for about four or five hours, more or less, according to the temperature on the exterior.

Either one of the heating elements may be used for generating heat on the interior of the incubator. Preferably the electric heating element is employed when the hen is setting, and the various dampers 22$^a$ and 23$^a$ are regulated for gauging the proper temperature in the chamber 17. The heat in the chamber 17 passes through the perforated wall 17$^a$, and thence percolates through the feathers 15, and also the feathers between the upper and lower canvases 14, and then through the canvases of the egg trays, and thereby insure incubator action upon the eggs which receive heat from above, due to the warmth descending from the body of the hen on the nest 5. This descending heat together with the feathers depending from the nest 5 act to insure the proper temperature of the eggs from above. To govern the temperature or heat in the chamber 17, the dampers 22$^a$ and 23$^a$ are adjusted accordingly, to insure an intake, and a discharge.

When the heating element 20 is turned off, the gas burner heating element may be turned on, and in this case dampers 30ª may be opened, to permit the heat from the chamber 30 to pass into the chamber 17 and thence to the upper compartments to the feather and egg trays. The lower part of the incubator is provided with the usual dampers 33 and 33ª similar to the dampers 22ª and 23ª, for governing the intake and escape of air in the chamber 30.

The wall of the entire casing of the incubator is hollow, and is filled with suitable feathers, to retain the heat on the interior of the incubator.

The invention having been set forth, what is claimed is:—

1. In an incubator, a casing having a hen compartment at its upper end including a nest, an egg tray compartment below the nest compartment, a heat compartment in the lower portion of the casing including a heater, for keeping the interior of the incubator warm and at the proper temperature to hatch the eggs.

2. In an incubator, a casing having a hen compartment at its upper end including a nest, an egg tray compartment below the nest compartment, a heat compartment in the lower portion of the casing including a heater, for keeping the interior of the incubator warm and at the proper temperature to hatch the eggs, and a moistening apparatus in the heat compartment.

3. In an incubator, a casing having a nest compartment at its upper end, a nest therein, invertible egg trays below the nest, and means suspended from the under surface of the nest and terminating in close position to the egg trays, to retain the heat and acting to keep those eggs which are not directly under the hen warm.

4. In an incubator, a casing having a nest compartment at its upper end, a nest therein, invertible egg trays below the nest, and means suspended from the under surface of the nest and terminating in close position to the egg trays, to retain the heat, and acting to keep those eggs which are not directly under the hen warm, and a feather tray arranged in the casing below the egg trays.

5. In an incubator, a casing including a heat compartment and the heater in the lower portion thereof, and provided with a nest compartment in its upper end, an egg tray receiving compartment below the nest compartment, invertible egg trays mounted in the tray compartment, a nest in the nest compartment immediately above the egg trays, and a feather tray immediately below the egg trays, the feather tray being above the heat compartment, the heat from the nest when the hen is therein acting to keep the eggs warm on top, whereas the feathers of the feather tray retain the heat from the heat compartment and keep the eggs warm from the bottom.

6. In an incubator, a casing including a heat compartment and the heater in the lower portion thereof, and provided with a nest compartment in its upper end, an egg tray receiving compartment below the nest compartment, invertible egg trays mounted in the tray compartment, a nest in the nest compartment immediately above the egg trays, and a feather tray immediately below the egg trays, the feather tray being above the heat compartment, the heat from the nest when the hen is therein acting to keep the eggs warm on top, whereas the feathers of the feather tray retain the heat from the heat compartment and keep the eggs warm from the bottom, warmth retaining means suspended from the under surface of the nest, acting to keep those eggs which are not directly under the hen warm.

In testimony whereof I hereunto affix my signature.

JACK HARRIS.